United States Patent [19]

Conner

[11] Patent Number: 4,518,508
[45] Date of Patent: May 21, 1985

[54] METHOD FOR TREATING WASTES BY SOLIDIFICATION

[75] Inventor: Jesse R. Conner, Atlanta, Ga.

[73] Assignee: SolidTek Systems, Inc., Morrow, Ga.

[21] Appl. No.: 606,852

[22] Filed: May 3, 1984

Related U.S. Application Data

[63] Continuation of Ser. No. 510,152, Jun. 30, 1983, abandoned, which is a continuation of Ser. No. 339,621, Jan. 15, 1982, abandoned.

[51] Int. Cl.$^3$ .................. C02F 11/14; C04B 31/00
[52] U.S. Cl. .................. 210/751; 106/76; 106/77; 106/84; 210/911; 252/628; 252/631
[58] Field of Search .............. 106/74, 76, 77, 78–81, 106/84; 210/609, 702, 710, 723, 726, 751, 768, 901, 911–914; 252/628, 631; 405/129, 263, 266

[56] References Cited

U.S. PATENT DOCUMENTS

| | | | |
|---|---|---|---|
| 1,436,061 | 11/1922 | Stryker et al. | 106/76 |
| 1,456,303 | 4/1923 | Ekstrom | 106/84 |
| 1,463,123 | 7/1923 | McAllister | 106/76 |
| 1,466,246 | 8/1923 | Parkyn | 106/81 |
| 1,470,674 | 10/1923 | Amies | 106/84 |
| 1,757,470 | 5/1930 | Peebles | 106/84 |
| 2,016,796 | 10/1935 | Brock et al. | 18/47.5 |
| 2,081,541 | 4/1937 | Joosten | 61/36 |
| 2,227,653 | 1/1941 | Langer | 61/36 |
| 2,662,022 | 12/1953 | Dietz | 106/74 |
| 2,809,118 | 10/1957 | Keil | 106/84 |
| 3,028,340 | 4/1962 | Gandon | 252/313 |
| 3,094,846 | 6/1963 | Peeler | 61/36 |
| 3,137,564 | 6/1964 | Mark | 71/62 |
| 3,149,985 | 9/1964 | Gandon | 106/74 |
| 3,178,299 | 4/1965 | Wilborn | 106/84 |
| 3,180,098 | 2/1962 | Spencer | 61/36 |
| 3,202,214 | 8/1965 | McLaughlin | 166/30 |
| 3,294,563 | 12/1966 | Williams | 106/74 |
| 3,306,756 | 2/1967 | Miller | 106/84 |
| 3,371,712 | 3/1968 | Adams | 166/33 |
| 3,374,834 | 3/1968 | Ramos et al. | 166/33 |
| 3,383,228 | 5/1968 | Rekate et al. | 106/84 |
| 3,411,582 | 11/1968 | Dale | 166/29 |
| 3,437,625 | 4/1969 | Bonnel et al. | 260/29.4 |
| 3,450,661 | 6/1969 | Neel | 260/29.6 |
| 3,493,406 | 2/1970 | Fillet | 106/74 |
| 3,558,506 | 1/1971 | Bonnell et al. | 252/316 |
| 3,615,780 | 10/1971 | Kim et al. | 106/74 |
| 3,642,503 | 2/1972 | Beaney | 106/38.35 |
| 3,837,872 | 9/1974 | Conner | 106/74 |
| 3,841,102 | 10/1974 | Cinner et al | 61/35 |
| 3,883,360 | 5/1975 | Ruiz | 106/74 |
| 3,893,656 | 7/1975 | Opacic et al. | 259/7 |
| 3,908,388 | 9/1975 | DeVries | 61/36 R |
| 3,959,172 | 5/1976 | Brownell et al. | 252/301.1 |
| 3,970,462 | 7/1976 | Stillman | 106/38.35 |
| 3,988,258 | 10/1976 | Curtiss et al. | 252/628 |
| 4,004,428 | 1/1977 | Tazawa et al. | 61/36 C |
| 4,012,320 | 3/1977 | Conner et al. | 210/45 |
| 4,018,616 | 4/1977 | Sugahara et al. | 106/74 |
| 4,030,939 | 6/1977 | Mallow | 106/74 |
| 4,056,937 | 11/1977 | Suzuki | 61/36 B |
| 4,072,019 | 2/1978 | Pearson | 61/36 C |
| 4,169,735 | 10/1979 | Boberski et al. | 106/84 |
| 4,171,986 | 10/1979 | Freyhold et al. | 106/74 |
| 4,173,546 | 11/1979 | Hayes | 252/301.1 |
| 4,208,216 | 6/1980 | Yamaguchi et al. | 106/74 |
| 4,213,785 | 7/1980 | Blanc et al. | 106/38.35 |

FOREIGN PATENT DOCUMENTS

| | | |
|---|---|---|
| 1009775 | 11/1972 | Canada . |
| 1003777 | 1/1977 | Canada . |
| 2426641 | 12/1974 | Fed. Rep. of Germany . |
| 48-13673 | 2/1973 | Japan . |
| 50-81963 | 7/1975 | Japan . |
| 54124553 | 9/1979 | Japan . |
| 1259821 | 1/1972 | United Kingdom . |
| 1313626 | 4/1973 | United Kingdom . |

*Primary Examiner*—Peter Hruskoci
*Attorney, Agent, or Firm*—Jones & Askew

[57] ABSTRACT

A method for treating aqueous liquid and semi-liquid wastes by solidification comprising the steps of mixing with the waste a dry water-reactive solidification agent comprising cement, a dry water absorbent material, and a powdered alkali metal silicate in a quantity sufficient to convert the mixture into a chemically and physically stable solid end product substantially insoluble in water and which contains no substantially free-standing water, and allowing the mixture to set to a sedentary mass. Additive agents such as surfactants, fixatives, waterproofing agents, coloring agents, and the like are also disclosed as assisting in the solidification reaction by reacting with certain constituents in the waste.

13 Claims, No Drawings

METHOD FOR TREATING WASTES BY SOLIDIFICATION

This application is a continuation of application Ser. No. 510,152, filed June 30, 1983 now abandoned which is a continuation of Ser. No. 339,621, filed Jan. 15, 1982 now abandoned.

BACKGROUND

1. Field of the Invention

This invention relates in general to waste treatment, and specifically relates to a method for treatment of aqueous liquid and semi-liquid waste sludges and slurries by solidification and/or fixation.

2. Description of the Prior Art

The processing of hazardous or offensive waste materials produced by municipalities and industries has reached critical importance in modern-day society. Concern for the quality of life and the environment have compelled governmental agencies to promulgate legislation to insure that future generations will not suffer from the effluvia of our present-day society. Under the regulations which implement these governmental edicts, waste must be discarded in a fashion which is non-offensive and presents little or no threat to the air, water, and land upon which the waste is ultimately disposed. The U.S. Congress in 1976 enacted Subtitle C of the Resource Conservation and Recovery Act of 1976 (RCRA), Public Law 94-580, for the purpose of instituting a national hazardous waste control program similar in function to the previously promulgated Air Pollution and Water Pollution Control program.

The U.S. Environmental Protection Agency, charged with the responsibility for implementing and supervising the hazardous waste control program called for under RCRA, promulgated in 1980 a series of regulations which require that certain sludges, slurries and other liquid wastes containing specified hazardous materials may no longer be deposited in landfills without pre-treatment, stabilization, and dewatering. Wastes must additionally have acceptable toxicity levels as measured by certain established tests before they can be discarded in a landfill. One primary objective of these governmental requirements is to achieve a non-flowing consistency of the waste by reduction of the liquid content or increase of the solid content to eliminate the presence of free liquids prior to final disposal in the landfill. The end result of this and other similar legislation and regulations is that many liquid or semi-liquid wastes containing hazardous materials will require dewatering, chemical fixation, solidification, or some combination thereof, prior to ultimate disposal.

Chemical fixation and solidification processes have found recent favor for detoxifying hazardous materials and for producing solid wastes having physical properties suitable for ultimate disposal in landfills, ocean dumping, etc. For example, U.S. Pat. No. 3,837,872, discloses a method for treating liquid wastes by adding an aqueous solution of an alkali metal silicate and a silicate setting agent, which converts the waste into a chemically and physically stabe solid product. The patent to Thompson, U.S. Pat. No. 3,980,558, discloses a method for treating liquid wastes by adding a solidification agent consisting essentially of hydraulic cement.

The terminology of chemical fixation and solidification has not been consistent in the prior art and there has been an aura of mystique surrounding such waste treatment processes, due primarily to the fact that until recently most of the waste treatment systems offered were considered proprietary. Such terms as "encapsulation", "crystal capture", and "pseudo mineral" often appear in the prior art instead of discussions concerning the operation of such systems, most likely because the actual chemical reactions involved are complex and not completely understood.

There is also a tendency in the prior art to confuse the terms "chemical fixation", "stabilization" and "solidification". "Stabilization" is essentially a pretreatment process which alters wastes to prevent further chemical reactions, e.g. the use of lime in biological sludges to kill or inactivate micro-organisms so that the sludge will not undergo further biological decomposition. "Chemical fixation" refers to the chemical technology used to destroy, de-toxify, immobilize, insolublize, or otherwise render a waste component less hazardous or less capable of finding its way into the environment. The term often denotes a chemical reaction between one or more waste components in a solid matrix, either introduced deliberately or preexisting in the waste. For example, the ion exchange of heavy metals within the alumino silicate matrix of a cementitious solidification agent is a chemical fixation. There is a wide variety of chemical fixation techniques known in the art for preparing waste residues for solidification, encapulation, or disposal without solidification.

The term "solidification" is the transformation of a waste residue into a solid physical form which is more suitable for storage, burial, transportation, ocean disposal, or re-use in processes such as highway paving. Solidification does not, by itself, affect the hazard potential of the waste. Solidification may reduce the hazard potential by means of creating a barrier between the waste particles and the environment, limiting permeability of the waste to water, or reducing the affected surface area of the waste available for diffusion. There are various types of solidification known in the art which do not incorporate chemical fixation. Moreover, the solidification of waste does not always involve a chemical process, e.g., drying, dewatering and filtration are physical processes which are sometimes considered "solidification".

Conventional chemical fixation and solidification techniques sometimes do not adequately treat wastes to obtain suitable end products for disposal. Generally, these prior art fixation and solidification techniques are unsuitable for sludges and slurries containing a low solids percent, for example, less than 10% to 20% by weight. Dewatering processes frequently cannot achieve a true solid and are sometimes subject to reversion to the original state by the simple addition of water. Pure absorption processes such as the addition of clays or lime suffer also from the problem of reversion to the original state. Moreover, in some wastes, the absorbed liquid phase of the waste can be squeezed out of the "solidified" material under mechanical pressure such as may occur in a landfill or even during handling or transporting processes.

The nuclear industry in the 1950's recognized the need for preventing the reversion of wastes into a liquid phase. Early methods in this industry employed simple absorption techniques such as the addition of vermiculite, or solidification by making a concrete mixture with very large quantities of Portland cement. Large quantities were required to assure that there would be no free standing water after curing of the cement. This inevitably resulted in a relatively large ratio of cement to waste and a large volume of end waste product which must be transported and disposed of. Substantial volume increases can make disposal prohibitively expensive in landfills which predicate disposal prices on volume.

Moreover, the Nuclear Regulatory Commission has stated in a preliminary draft of 10 CFR Part 61 that any nuclear wastes containing liquids must be immobilized by solidification to an end product in a dry, free-standing, homogeneous, monolithic matrix which is not readily dispersible, friable or soluble and which contains not more than 0.5% or one gallon per container, whichever is less, of noncorrosive liquids. Under these standards, liquids that have been immobilized by only the addition of absorbent materials such as diatomaceous earth or vermiculite are not acceptable waste forms.

The cement-silicate solidification process such as disclosed in U.S. Pat. No. 3,837,872 referenced above is designed to provide a solidification waste treatment method which does not allow reversion to the liquid phase after gel and which has a reduced volume of end product. The method is usable with a wide variety of wastes including those emanating from manufacturing, metal producing operation, and the like, which contain large concentrations of toxic polyvalent metals. This cement-silicate technology was developed primarily for use with water-based, primarily inorganic wastes with low to moderate solids content (1–30%). The technology was specifically designed for use with continuous processing equipment wherein a liquid silicate solution can be added in a controlled manner so as to control the set or "gel" time. The gel time is controlled by the concentrations of cement and liquid silicate as well as the composition of the waste. In many applications, liquid silicate solidification systems have such short gel times that setting begins before the mixed waste leaves the processing equipment.

A problem with conventional cement-liquid silicate solution solidification treatment processes is that the two components of the system must be added to the waste separately since pre-mixing of such waste treatment materials would result in immediate setting thereof. The rapid setting rate of a cement and liquid silicate solidification system, together with the fact that the components must be added separately, makes the system usable only with continuous processes and very difficult to use in batch waste treatment.

The use of a dry soluble silicate instead of a liquid silicate solution together with cement for waste treatment has provided a different problem. This type of waste treatment requires more time for the gel reaction to occur since the silicate must solublize before it can gel. During this time, some settling of the sludge may occur in batch-processing treatment facilities or in continuous processes with low flow rates or inadequate agitation. If there is settling of the sludge prior to gel, free-standing water will occur on the top of the waste, which renders the treatment incomplete and unsatisfactory.

BRIEF SUMMARY OF THE INVENTION

Briefly described, the present invention is a method for treating aqueous liquid and semi-liquid wastes to render them fit for ultimate disposal comprising the steps of adding to the waste a dry water-reactive solidification agent comprising cement, a dry water absorbent material, and a powdered alkali metal silicate in a quantity sufficient to convert the mixture into a consolidated chemically and physically stable solid which is substantially insoluble in water and which contains substantially no free standing water. Thereafter, the mixture is allowed to set to a sedentary mass. A preferred solidification agent for use in the method of the present invention has a ratio of cement to water absorbent material ranging from between about 1:19 to about 47.5:1, a ratio of cement to alkali metal silicate ranging from between about 2:1 to about 200:1, and a ratio of alkali metal silicate to water absorbent ranging from between about 1:3,800 to about 3:1.

After the introduction of the solidification agent and the allowance of sufficient time for the mixture to set, the resultant end product is a solid material varying in consistency from a rock-like solid to a friable material, depending upon the particular waste treated, the amount of solidification agent added, and the relative proportion of cement, water absorbent material, and alkali metal silicate.

The solid structure of the end product is a pseudo-mineral formed of a silicate matrix which is based on tetrahedrally coordinated silicon atoms alternating with oxygen atoms along the backbone of a linear chain. There is strong ionic bonding between adjacent chains to form polymer matrices which are very similar to many of the natural pyroxene minerals. Consequently, the end product displays properties of high stability, high melting point, and substantially imperviousness to leaching of waste constituents encapsulated in the matrix.

The solidification agent is characterized by a relative low cost and widespread availability of the chemical ingredients, which are generally non-toxic in themselves. The method is therefore relatively easy to practice since the chemical processes normally occur at ambient temperatures and pressures and without unique or special processing equipment. Advantageously, only relatively low volume increases are resultant, in contrast to conventional solidification agents which consist mainly of cement. The end product is further inert to ultraviolet radiation and shows extremely high resistance to biodegradation. Because of the matrix structure, the end product displays low water solubility and permeability, and mechanical and structural characteristics suitable for disposal in landfills, ocean disposal, and construction of highway roadbeds and the like.

Accordingly, it is an object of the present invention to provide an improved method for waste treatment.

It is a further object of the present invention to provide an improved solidification agent useful in applications requiring waste treatment by solidification.

It is a further object of the present invention to provide a method for treating liquid and semi-liquid waste which produces a substantially solid end waste material having suitable physical and chemical characteristics for use in a landfill or other areas requiring relatively inert filler material.

It is a further object of the present invention to provide a method for treating aqueous liquid and semi-liquid waste which does not undesirably increase the volume of the end waste product to the point where landfill disposal is economically infeasible.

It is a further object of the present invention to provide a method for treating aqueous liquid and semi-liquid wastes which produces an end waste product having acceptable toxicity levels as measured by currently prevailing governmental regulations concerning same.

It is a further object of the present invention to provide a method for treating aqueous liquid and semi-liquid wastes whose final end waste product is a solid material possessing chemical properties substantially impervious to leaching and which substantially encapsulates non-soluble hazardous materials.

It is a further object of the present invention to provide a method for treatment of aqueous liquid and semi-liquid wastes which is characterized by the use of a relatively low cost solidification agent, the constituents of which are widely available and generally non-toxic.

It is a further object of the present invention to provide a method for treating aqueous liquid and semi-liquid wastes which is characterized by the use of a solidification agent which may be pre-mixed in desired proportions, which is relatively easy to use by simple addition of the agent to the waste, and which involves chemical processes which normally operate at ambient temperatures and pressures without unique or special processing equipment.

It is a further object of the present invention to provide an end waste product of waste treatment which is characterized by a relatively low volume increases, inertness to ultraviolet radiation, high resistance to biodegradation, low water solubility and permeability, and possesses mechanical and structural characteristics suitable for disposal in a landfill.

These and other objects, features, and advantages of the method of the present invention will become apparent after a review of the following detailed description of the disclosed embodiments and the appended claims.

DETAILED DESCRIPTION OF THE DISCLOSED EMBODIMENT

The method of the present invention comprises the steps of adding to an aqueous liquid or semi-liquid wastes a dry water-reactive solidification agent comprising cement, a dry water absorbent material, and a powdered alkali metal silicate in a quantity sufficient to convert the mixture into a consolidated chemically and physical stable solid product substantially insoluble in water and which contains substantially no free-standing water. The waste is then thoroughly mixed with the solidification agent and allowed to set for a period of time sufficient to render the mixture a sedentary mass.

The end product of the method of the present invention is a solid structure formed of a basic silicate matrix which is based on tetrahedrally coordinated silicon atoms alternating with oxygen atoms along the backbone of a linear chain. The charged side groups of the chain, in this case oxygen, when reacted with polyvalent metal ions, result in strong ionic bonding between adjacent chains to form cross-linked three-dimensional polymer matrices which are very much like many of the natural pyroxene minerals. Thus, the end product itself is actually a pseudo-mineral. This type of structure displays high stability, a high melting point, and, depending upon the specific formulation, produces a product varying from a rigid, friable structure similar to many soils to a hard, monolithic, synthetic rock-like material.

In addition to the basic components of the solidification agent, various minor component additives may also be used to adapt the basic solidification agent to a particular waste. Also, additives which insolublize and precipitate specific waste components, especially the toxic metals, may also be included in the formulation of the solidification agent. For example, additives comprising fixatives, waterproofing agents, surfactants, and the like satisfy certain desired purposes, which are discussed in detail below.

The resultant solidified end product displays other properties which make the treated waste suitable for various final disposal uses. For example, the lowered permeability and susceptibility to leaching renders the solidified waste suitable for use in a landfill. The end product formed from the chemical reaction is thermodynamically and kinetically stable under normally encountered ambient temperatures and pressures. Consequently, such environmental factors as ground water activity, wind and rain erosion, biological degradation, and ultraviolet radiation only minimally affect the solidified waste product. If the solidified waste is to be buried or covered as is normally the case, then the effects of erosion and ultraviolet radiation do not apply. The use of the inorganic siliceous portion of the solidification agent provides a strong imperviousness to the affects of ambient ground water and biological degradation. The basic chemistry of these systems is the same as that of common rocks, clay, concrete, glass and the like which are known to be among the most stable physical forms. Consequently, the waste product formed by practice of the present invention can be expected to change very slowly in the ground as a function of time, on the same scale as that of natural rocks and minerals. Moreover, the stable matrix is substantially impervious to leaching of the waste constituents from the matrix under leaching tests currently required by governmental agencies.

The solidification agent disclosed herein for use in the method of the present invention comprises cement, a dry powdered alkali metal silicate and a dry water absorbent material. The formulation range of these primary components varies from between about 10–90% by weight for cement, from between about 0.1–20% by weight of powdered alkali metal silicate, and from between about 3–50% by weight of water absorbent material. Minor additives such as hydrated lime, iron oxide, surfactants, waterproofing agents, and fixatives may be added in quantities sufficient to treat particular waste constituents.

The alkali metal silicates preferred for use in the solidification agent are soluble sodium silicates. However, other soluble alkali metal silicates such as potassium silicates, lithium silicates, and the like are suitable if available. These soluble silicates may also be formed from metasilicates, orthosilicates, and the like from sodium, potassium, lithium, and the like. Thus, it will be appreciated that silicate "polymers" or polysilicates are therefore included as suitable alkali metal silicates useful in the present invention.

The primary requirement for a soluble silicate for use in the present invention is that it dissolve rapidly in water at ambient temperatures and pressures. Suitable soluble sodium silicates ($SiO_2:Na_2O$) are usually manufactured by fusing soda ash (sodium carbonate) and silica sand to form a glass, then crushing the glass to a fine powder. This results in an anhydrous product having relatively low ratios of $SiO_2:Na_2O$, such as less than 2:1. Ratios of $SiO_2:Na_2O$ as high as 3.22:1 are virtually insoluble in water at normal temperatures and pressures and must be formed by dissolving the chemicals in high pressure steam to make sodium silicate solutions which are spray dried to yield a hydrated, water soluble powder.

Commercial soluble silicates suitable for use in the present invention include grade Uniflo 26 sodium metasilicate, pentahydrate, manufactured by Diamond Shamrock Corporation of Cleveland, Ohio, having a ratio of $SiO_2:Na_2O$ of 0.995:1 and a percentage of water of 42%; special grade S-25 anhydrous sodium metasilicate also manufactured by Diamond Shamrock Corporation having a $SiO_2:Na_2O$ ratio of 1.03:1 and a percentage of water less than 1%; and grade G hydrous sodium silicate manufactured by Philadelphia Quartz Company of Valley Forge, Pa., having a ratio of $SiO_2:Na_2O$ of 3.22:1 and a percentage of water of about 19%.

The cement used in the present invention is preferably a Portland cement since it has been found that such cements give the best results. Any of the various grades categorized as Portland cement can successfully be used, but generally, type I is preferable because it is the most widely available and lowest cost cement. Other grades may be used either for cost or availability reasons in specific situations or where other grades may perform better with a specific waste by actual testing.

The cement-alkali metal silicate solidification system has been found to be readily adaptable to a large variety of water-based wastes. However, the solidification system has also been found to be sensitive to certain waste constituents which act as inhibitors or otherwise interfere with solidification. The interactions between the waste constituent and the chemicals are extremely complex because many different reactions occur simultaneously, especially with wastes containing a variety of reactive pollutants. Three general classes of interactions which have been identified include reactions between the sodium silicate and the waste being treated, reactions between the silicate and certain reactive components such as the calcium ion of the Portland cement, and the reaction of Portland cement itself with water such as hydrolysis and hydration. These reactions and the ability of the resultant end product to encapsulate and hold waste constituents are discussed more fully in U.S. Pat. No. 3,837,872, the disclosure of which is incorporated herein by reference.

Certain chemical waste constituents which have been identified as solidification inhibitors fall within two basic categories: inhibitors of the cement-setting reaction, and inhibitors or precipitators of the silicate or of the cement-silicate mix. Some known cement setting inhibitors include borates; phosphates; sulfide ions; sodium arsenate; sulfates in high concentrations; oil in high concentrations; certain metal salts including lead, zinc and copper; organics in various concentrations; and very finely divided particulate matter. Inhibitors or precipitators of the silicate or of the cement-silicate mix include ammonia or ammonium compounds, active anaerobic conditions, high concentrations of aromatic organics, pH conditions less than 4, nitrates, high concentrations of metal ions, and water soluble organics.

When any of the known inhibitors or precipitators are present in the waste being treated, the gel time of the cement-silicate mix is more difficult to predict and control. Often, free-standing water will be found on the top of the solidified waste when precipitation has occurred or when settling of certain waste constituents in the sludge occurs prior to gelling or setting. This free-standing water is a significant problem in conventional alkali metal silicate-cement solidification systems since the water can contain toxic substances in solution.

Water excretion can also occur with conventional alkali metal silicate-cement solidification with overmixing or hard freezing which can break the initial, relatively delicate gel. Phase separation can also result in free-standing water where an immiscible hydrophobic liquid component separates from an emulsion of water and oil.

The addition of a dry water absorbent material to the alkali metal silicate-cement mixtures solves many of the problems associated with many conventional waste treatment system. Certain water absorbent materials have been found to act as a viscosity control agent, reactant, surface agent, settling control agent, permeability reducer, ion-exchanger, constituent absorbent, reaction controller, and anti-inhibition agent. Although some of these functions might seem contradictory, for any given waste only a few of these characteristics are evident. The combination of water absorption and viscosity control prevents settling of the waste and solids contained therein until the gelation reaction can occur. The balance between settling and gelation is critical with cement-soluble silicate treatment systems. If gelation occurs too slowly and settling occurs too rapidly, water excretion will occur on top of the solid. If gelation occurs too rapidly, operational problems with handling the waste emerge. Therefore, the addition of a water absorbent material provides the surprising result that the reaction time can be controlled as well as excess water can be absorbed and held until the reaction has occurred.

To be useful in the present invention, a water absorbent material must have fine particles and high surface area, so that hydrophilic properties are evident. Various types of clays have been found to be the most suitable water absorbent material. Certain clays seem to act as activators, which aid and control the set of the gel. The clays prevent the excretion of surface water in the treatment of fast settling wastes. The settling rate of the solids in the waste is to be controlled primarily by the addition of more or less clay.

Since clays are natural minerals which occur in many locations, the characteristics are extremely varied. Particular types of clays which have been found suitable for use in present invention include type Kaolinite, grade Barden manufactured by I.M. Huber Company of Huber, Ga., having a fineness of 325 mesh (94%); type Bentonite (sodium), grade High-Gel, manufactured by American Colloid Company of Skokie, Ill., having a fineness of 200 mesh (65%); type Montmorillonite (calcium), grade Ren-Fre GBW, manufactured by Oil Dri Corporation of Chicago, Ill., having a fineness of 200 mesh (80%); and type Attapulgite, grade Attagel 40, manufactured by Engelhard Minerals & Chemicals Corporation of Edison, N.J., having a fineness of 0.14 microns.

It will be appreciated by those skilled in the art that other clays, other similar mineral products, and other water absorbent materials may be successfully employed in the present invention. For example, non-clay poducts, such as natural gums, natural and synthetic gelling agents, and the like may also be successfully used since the primary purpose is water absorption and viscosity control. Specific types of non-clay water absorbent materials useful in the present invention include diatomaceous earth, type Celaton MN41, manufactured by Eagle Picher Corporation, Cincinnati, Ohio; calcium silicate, type Micro-Cel, manufactured by Johns-Mansville Corporation, Littleton, Colo.; fumed silica, type Cab-O-Sil, manufactured by Cabot Corporation, Tuscola, Ill.; acrylic polymer, type Permasorb 29, manufactured by National Starch & Chemical Corp., Bridgewater, N.J.; styrene polymer, type Imbiber Beads, manufactured by Dow Chemical Company, Midland, Mich.; natural gum, type Guar Gum, manufactured by Meer Corporation, North Bergen, N.J.; organo-aluminum compounds, type aluminum isopropylate, manufactured by Chattem Chemicals, Chattanooga, Tenn.; and cellulosics, type Cellosize, manufactured by Union Carbide Corporation, Danbury, Conn. Generally, however, mineral products such as clays provide the best combination of economics, availability, stability and function.

A typical formulation of the solidification agent disclosed herein as proportions of cement to water absorbent material ranging from between about 1:19 to about 47.5:1, cement to alkali metal silicate ranging from between about 2:1 to about 200:1, and alkali metal silicate to water absorbent ranging from between about 1:3,800 to about 3:1. The relative proportions of the components are varied to adjust to the desired friability or solidity of the end product, the rate of gel, the presence of inhibiting agents, and the proportion of solid waste product to water in the waste sludge or slurry. A typical formulation for a high solids waste sludge might be 1.5 pounds per gallon of a mixture of 65% Portland cement, 10% sodium silicate, and 20% clay, with a coloring agent (iron oxide) of about 1%, a surfactant of about 0.1% and lime (for acid neutralization) about 3.9%. Typical additive rates may vary from about 10% by weight to about 50% by weight, or from about 1 to about 5 pounds per gallon of waste.

The overall operative ranges of ingredients for a preferred formulation of the solidification agent including additives may be expected to be, by percent of weight of the formulation, Portland cement, 5–95%; powdered soluble alkali metal silicate; 0.1–30%; clay, 2–80%; lime (for alkalinity adjustment), 0–40%; iron oxide or other colorant, 0–3%; surfactant, 0–0.1%; and other additives, 0–1.0%. The setting time may range from about 5 minutes to one or more days, depending upon the formulation, addition rate, waste composition, and ambient temperature and humidity. Typically, an initial setting time of 30 to 60 minutes is desirable for most applications. After initial setting, hardening continues for several days, with 75% of the hardness typically achieved within 10 to 20 days. The basic formulation of Portland cement, sodium silicate, and clay is generally considered non-hazardous and is easy to handle and use. Since the formulations tend to be alkaline, and since nearly all formulations can contain very fine powders which can be irritating to mucous membranes, it is generally advisable to utilize caution in handling the chemicals, for example, eye protection and dust masks should be used.

In determining the proper formulation, the question of volume increase associated with the end product must be considered. This factor can be extremely important when the end product is to be disposed in landfills or transported. In the future, volume increase may be the most important single factor in formulating a solidification agent if, as is suspected, the value of landfill disposal space for chemical wastes continues to rise at a rapid rate. Volume increase may be controlled as a function of the formulation, additive ratios, and properties of the waste being treated. Anticipated volume increases of the end waste product for typical formulations of the solidification should range from between about 4% to about 25%.

In formulating a solidification agent for use in the present invention, the particular waste being treated should be analyzed. Usually, the medium in which the waste is dispersed is a water-based waste which may contain emulsions of liquid organic substances such as oil. The primary physical properties of the waste which affect the formulation include the solids content, the particle size distribution and shape, viscosity and specific gravity. It is generally desirable to have a high solids content because smaller amounts of solidification agent may be added, provided that the solidification agent does not itself react with solids. The chemical nature of the waste also affects the solidification process. In addition to cement setting inhibitors which are discussed above, acceleration of the chemical reaction and biological activity can affect the properties of the end waste product. Accelerators for Portland cement setting and curing include calcium chloride and sodium silicate. Biological activity also causes problems and is generally unpredictable on a theoretical basis. A biologically active organic sludge often produces hydrogen sulfide and other sulfur compounds which can affect the setting reaction. It has been found that sometimes the waste will not harden in the presence of the sulfur compounds.

In order to counteract the effect of inhibitors, accelerators, or other waste constituents which affect the basic cement-silicate solidification process or the fixation of waste constituents in the solidified matrix, it may sometimes be desirable to include additives in the formulation of the solidification agent. Fixatives, waterproofing agents, and surfactants are additives which can assist the solidification of wastes containing certain types of solidification-affecting constituents. Clay, lime, and surfactants all act to eliminate the effects of inhibitors. Clay and lime, and to some extent cement, fix metals by absorption, ion-exchange and hydroxide formation, and gradually react with insoluble silicates to form the basis for the cement. The settling rate of solids in the waste may be controlled primarily by the addition of more clay, and to a lesser degree by the addition of lime.

A fixative, which is a compound which reacts with one or more constituents of the waste to form a less soluble compound, thereby retarding or preventing leaching of the waste, may be added to the formulation. For example, a waste containing lead carbonate is soluble in acid and therefore requires a fixative to insolubilize the lead compound. The insoluble form of the specific constituent is then entrapped in the inorganic polymeric matrix and completely immobilized. Fixatives useful in the present invention include gypsum, plaster of paris (calcium sulfate hemihydrate), and diammonium phosphate.

A waterproofing agent is a compound which does not react chemically with the waste but prevents or retards leaching by sealing the waste particle within the solidified waste mass. Calcium stearate is a waterproofing agent useful in the present invention.

A surfactant is a compound which may be added to allow reaction to occur between a particular waste constituent and another constituent. Generally, surfactants enhance or accelerate the solidification reaction. Surfactants useful in the present invention include detergents, wetting agents, defoamers and the like. Although the mechanism by which surfactants operate is not clearly understood, it is thought that surfactants decrease interfacial tension between particles and thereby allow reaction between the waste particle and another constituent. Certain surfactants counteract the inhibiting effect of an aerobic condition in a biologically active waste sludge, and thereby allow the basic solidification agent to operate without requiring that uneconomical levels of the agent be added.

Surfactants perform a variety of functions including emulsification, gel stabilization, the wetting of hydrophobic waste constituents, and deactivation of certain inhibitors. Triton X-100, a sulfonated alkylphenol having a hydrophile-lipophile balance number of 13.5, manufactured by Rohm & Haas Company, Philadelphia, Pa. is a surfactant which may be used to counteract the inhibiting effect of anaerobic conditions in a biologically active waste sludge. The choice of surfactant depends upon the function required and the prevalent electrical surface charge on the suspended particulate or colloidal matter. The surfactants may usually be added in low amounts, usually only from between about 0.001 to about 1% of the total additive volume.

A mixing indicator or colorant such as iron oxide or the like may also be added. These substances, originally used as a colorant to indicate when mixing is complete, have been found to function in an unknown manner as activators in the setting reaction of the solidification agent disclosed herein. Other metal oxides may be used for the same purpose, but iron oxide is particularly suited for the method of the present invention due to its low cost, high coloring power and non-toxicity.

Commercial iron oxide grades found operative in the present invention include grade Mapico Red 347, manufactured by Cities Service Company, Atlanta, Ga., and grade RO 3097, manufactured by Pfizer Chemical Company, Atlanta, Ga. Finer particle sizes are preferable for a coloring agent, since particle size affects coloring power and effectiveness as an activator.

Lime, either anhydrous (quick) or hydrated, may be added to neutralize excess acidity in the waste. To a certain extent lime will act as a water absorbent, so the amount of clay may have to be adjusted accordingly. Many of the commercially available limes, including ground limestone (agricultural lime) are suitable for acid neutralization.

The following examples are set forth to illustrate the method of the present invention and are not intended to be limitative thereof. In the examples, the compressive strength of the waste is defined as unconfined compressive strength measured in tons per square foot, as measured by a conventional penetration strength tester such as the Model CL700 POCKET PENETROMETER manufactured by Soiltest, Inc., of Evanston, Ill. Chemical costs are reported in cents per gallon of as-received waste prior to treatment and are based upon the approximate cost of bulk procurement of such materials by commercial entities in December, 1981.

EXAMPLE 1

A waste sludge from the chemical conversion coating of aluminum in the aircraft industry, comprising emulsified cutting oils, organic compounds and trace amounts of metals, having solids by weight of 3%, pH of 7.5 and low viscosity, was treated in accordance with the method of the present invention as described hereinabove. The formulation achieved compressive strength of 4.2 tons/sq.ft. after curing for 10 days. The results of this treatment are indicated below:

| Solidification Agent | Vol. Increase (%) | Cost ¢/gal. |
| --- | --- | --- |
| 3.6 lb/gal. Portland cement + 0.4 lb/gal. Sodium metasilicate Grade S-25 + 0.95 lb/gal. Barden grade kaolin + 0.05 lb/gal. iron oxide grade RO 3097. | 25 | 31.5 |

EXAMPLE 2

A digested sewage sludge from the activated sludge process at a municipal sewage plant, comprising phosphates, nitrogen compounds, organics, and the metals chromium, lead, copper and zinc, having solids by weight of 2%, pH of 5.8 and low viscosity, was treated in accordance with the method of the present invention as described hereinabove. The formulation achieved compressive strength of 3.2 tons/sq.ft. after curing for 10 days. The results of this treatment are indicated below:

| Solidification Agent | Vol. Increase (%) | Cost ¢/gal. |
| --- | --- | --- |
| 2.88 lb/gal. Portland cement + 0.32 lb/gal. sodium metasilicate Grade S-25 + 0.76 lb/gal. Barden grade kaolin + 0.04 lb/gal. iron oxide grade RO 3097. | 20 | 25.2 |

EXAMPLE 3

A rapid settling waste filter cake slurry from the production of organic surfactants, comprising diatomaceous earth, naphthalene and naphthalene sulfonates, having solids by weight of 65%, pH of 8.8, and moderate viscosity when stirred, was treated in accordance with the method of the present invention as described hereinabove. The formulation achieved compressive strength of 4.5 tons/sq.ft. after curing for 11 days. The results of this treatment are indicated below:

| Solidification Agent | Vol. Increase (%) | Cost ¢/gal. |
| --- | --- | --- |
| 0.96 lb/gal. Portland cement + 0.11 lb/gal. sodium silicate grade G hydrous + 0.25 lb/gal. Barden grade kaolin + 0.01 lb/gal. iron oxide grade Mapico Red 347. | 6.5 | 7.3 |

EXAMPLE 4

A waste slurry from the pretreatment for painting of metal surfaces, comprising zinc phosphate and small amounts of organics, having solids by weight of 2%, pH of 3.6, and low viscosity, was treated in accordance with the method of the present invention as described hereinabove. The formulation achieved compressive strength of 2.8 tons/sq.ft. after curing for 10 days. The results of this treatment are indicated below:

| Solidification Agent | Vol. Increase (%) | Cost ¢/gal. |
| --- | --- | --- |
| 1.44 lb/gal. Portland cement + 0.16 lb/gal. sodium metasilicate Grade S-25 + 0.68 lb/gal. Barden grade kaolin + 1.0 lb/gal. hydrated lime + 0.02 lb/gal. iron oxide grade RO 3097. | 15 | 14.2 |

EXAMPLE 5

A lagoon sludge from an oil refinery, comprising oil, silt, metal compounds, and various organic compounds, having solids by weight of 25%, pH of 3.5, and moderate viscosity, is treated in accordance with the method of the present invention as described hereinabove. The formulation should achieve compressive strength of at least 2.5 tons/sq.ft. after curing for 10 days. The anticipated results of this treatment are indicated below:

| Solidification Agent | Vol. Increase (%) | Cost ¢/gal. |
| --- | --- | --- |
| 1.3 lb/gal. Portland cement + 0.23 lb/gal. sodium metasilicate grade Uniflo 26 + 0.65 lb/gal. Ren-Fre GBW Grade Montmorillonite + 0.25 lb/gal. hydrated lime + 0.003 lb/gal. non-ionic surfactant. | 13 | 12.5 |

EXAMPLE 6

A waste slurry from an inorganic chemicals manufacturing plant, comprising barium and other metals, silt, and organics, having solids by weight of 5%, pH of 7.5 and low viscosity, is treated in accordance with the method of the present invention as described hereinabove. The formulation should achieve compressive strength of at least 3.0 tons/sq.ft. after curing for 10 days. The anticipated results of this treatment are indicated below:

| Solidification Agent | Vol. Increase (%) | Cost ¢/gal. |
| --- | --- | --- |
| 1.3 lb/gal. Portland cement + 0.16 lb/gal. sodium metasilicate grade Uniflo 26 + 0.4 lb/gal. Ren-Fre GBW Grade Montmorillonite + 0.12 lb/gal. calcium sulfate hemihydrate + 0.02 lb/gal. iron oxide Grade RO 3097. | 10 | 10.5 |

EXAMPLE 7

An acidic oily sludge from an oil refinery comprising oil and inorganic solids, water, metals, having total solids by weight of about 30%, a pH of about 5, with a medium viscosity, is treated in accordance with the method of the present invention as described hereinabove. The formulation should achieve compresive strength of about 3 tons/sq.ft. after curing for 10 days. The anticipated results of this treatment are indicated below:

| Solidification Agent | Vol. Increase (%) | Cost ¢/gal. |
| --- | --- | --- |
| 4 lb/gal. Ren-Fre GBW Grade Montmorrillonite + 0.9 lb/gal. Portland cement + 0.1 lb/gal. sodium metasilicate Grade S-25 + 0.05 lb/gal. iron oxide grade RO 3097. | 25 | 20 |

EXAMPLE 8

A filter cake from a metal finishing plant comprising mainly metal oxides and hydroxides including cadmium having total solids by weight of about 20%, a pH of about 7, with a medium viscosity, is treated in accordance with the method of the present invention as described hereinabove. The formulation should achieve compressive strength of about 4.5 tons/sq.ft. after curing for 10 days. The anticipated results of this treatment are indicated below:

| Solidification Agent | Vol. Increase (%) | Cost ¢/gal. |
| --- | --- | --- |
| 0.95 lb/gal. Portland cement + 0.02 lb/gal. Barden grade kaolin + 0.03 lb/gal. sodium silicate Grade G hydrous + 0.01 lb/gal. iron oxide Grade RO 3097. | 5 | 6 |

EXAMPLE 9

A filter cake from a metal finishing plant comprising mainly metal oxides and hydroxides including cadmium having total solids by weight of about 30%, a pH of about 8, with a high viscosity, is treated in accordance with the method of the present invention as described hereinabove. The formulation should achieve compressive strength of about 4 tons/sq.ft. after curing for 10 days. The anticipated results of this treatment are indicated below:

| Solidification Agent | Vol. Increase (%) | Cost ¢/gal. |
| --- | --- | --- |
| 0.3 lb/gal. sodium silicate Grade G hydrous + 0.6 lb/gal. Portland cement + 0.1 lb/gal. Barden grade kaolin + 0.01 lb/gal. iron oxide grade RO 3097. | 5 | 17 |

EXAMPLE 10

An alkaline (pH=12-13) fluid-like sludge from an oil refinery comprising oil, dissolved inorganic solids and organic solids, having a high dissolved solids content by weight of about 30%, with a low-to-medium viscosity, is treated in accordance with the method of the present invention as described hereinabove. The formulation should achieve compressive strength of about 3 tons/sq.ft. after curing for 10 days. The anticipated results of this treatment are indicated below:

| Solidification Agent | Vol. Increase (%) | Cost ¢/gal. |
|---|---|---|
| 3.8 lb/gal. kaolin + 0.2 lb/gal. Portland cement + 0.001 lb/gal. sodium metasilicate grade Uniflo 26 + 0.04 lb/gal. iron oxide grade Mapico Red 347. | 20 | 13 |

EXAMPLE 11

An alkaline (pH=12-13) fluid-like sludge from an oil refinery comprising oil, dissolved inorganic solids and organic solids, having a high dissolved solids content by weight of about 30%, with a low-to-medium viscosity, is treated in accordance with the method of the present invention as described hereinabove. The formulation should achieve compressive strength of about 3 tons/sq.ft. after curing for 10 days. The anticipated results of this treatment are indicated below:

| Solidification Agent | Vol. Increase (%) | Cost ¢/gal. |
|---|---|---|
| 1.9 lb/gal. Imibiber Beads + 0.2 lb/gal. Portland cement + 0.001 lb/gal. sodium metasilicate grade Uniflo 26 + 0.04 lb/gal. iron oxide grade Mapico Red 347. | 20 | 955 |

EXAMPLE 12

A digested sewage sludge from the activated sludge process at a municipal sewage plant, comprising phosphates, nitrogen compounds, organics, and the metal chromium, lead, copper and zinc, having solids by weight of 2%, pH of 5.8 and low viscosity, is treated in accordance with the method of the present invention as described hereinabove. The formulation should achieve compressive strength of about 3.2 tons/sq.ft. after curing for 10 days. The anticipated results of this treatment are indicated below:

| Solidification Agent | Vol. Increase (%) | Cost ¢/gal. |
|---|---|---|
| 2.88 lb/gal. Portland cement + 0.32 lb/gal. sodium metasilicate Grade S-25 + 0.2 lb/gal. fumed silica + 0.04 lb/gal. iron oxide grade RO 3097. | 20 | 70 |

EXAMPLE 13

A waste sludge from the chemical conversion coating of aluminum in the aircraft industry, comprising emulsified cutting oils, organic compounds and trace amounts of metals, having solids by weight of 3%, pH of 7.5 and low viscosity, is treated in accordance with the method of the present invention as described hereinabove. The formulation should achieve compressive strength of 4.2 tons/sq.ft., after curing for 10 days. The anticipated results of this treatment are indicated below:

| Solidification Agent | Vol. Increase (%) | Cost ¢/gal. |
|---|---|---|
| 3.6 lb/gal. Portland cement + 0.4 lb/gal. sodium metasilicate Grade S-25 + 0.3 lb/gal. natural gum type Guar Gum + 0.05 lb/gal. iron grade RO 3097. | 25 | 49 |

Obviously, many modifications and variations of the invention as hereinbefore set forth may be made without departing from the spirit and the scope thereof, and therefore, only such limitations should be imposed as are indicated in the following claims.

I claim:

1. A method of treating a batch of aqueous liquid and semi-liquid wastes to render them fit for ultimate disposal in a sedentary mass, comprising the steps of:

premixing a solidification agent by admixing cement, a dry water absorbent clay having fine particles, said particles having high surface area, and a powdered alkali metal silicate, wherein said solidification agent has a ratio of cement to clay between about 1:19 and about 47.5:1, a ratio of cement to alkali metal silicate between about 2:1 and about 2000:1, and a ratio of alkali metal silicate to clay between about 1:3,800 and about 3:1;

treating the batch of waste by admixing said premixed solidification agent with the waste in a quantity sufficient to convert the mixture into a chemically and physically stable solid product substantially insoluble in water and which contains substantially no free-standing water; and allowing the admixture to set to a sedentary mass.

2. The method of claim 1, wherein said cement comprises Portland cement.

3. The method of claim 1, wherein said alkali metal silicate comprises sodium silicate.

4. The method of claim 1, wherein said alkali metal silicate comprises sodium metasilicate.

5. The method of claim 1, wherein the amount of said solidification agent added to the waste is between about one pound per gallon of waste and about five pounds per gallon of waste.

6. The method of claim 1, wherein said solidification agent further comprises a mixing indicator to indicate when mixing is complete.

7. The method of claim 6, wherein said mixing indicator comprises iron oxide.

8. The method of claim 1, wherein said solidification agent further comprises a surfactant.

9. The method of claim 8, wherein said surfactant comprises a sulfonated alkylphenol.

10. The method of claim 1, wherein said solidification agent further comprises a fixative.

11. The method of claim 10, wherein said fixative is selected from the group consisting of gypsum, plaster of paris, and diammonium phosphate.

12. The method of claim 1, wherein said solidification agent further comprises a waterproofing agent.

13. The method of claim 12, wherein said waterproofing agent comprises calcium stearate.

* * * * *